United States Patent [19]

Jaramillo et al.

[11] 4,225,970
[45] Sep. 30, 1980

[54] SPLASH PROOF PORTABLE TWO-WAY DATA TERMINAL/RADIO

[75] Inventors: Giovanni Jaramillo, Plantation; Melvin Teitzman, Lauderhill; Richard D. Lipinski, Coral Springs, all of Fla.

[73] Assignee: Motorola, Inc., Schaumburg, Ill.

[21] Appl. No.: 963,593

[22] Filed: Nov. 24, 1978

[51] Int. Cl.³ ............................................... H01B 1/38
[52] U.S. Cl. ..................................... 455/89; 455/90; 455/351
[58] Field of Search ............ 325/15, 16, 66, 111, 325/116, 119, 352, 361; 200/5 A

[56] References Cited

U.S. PATENT DOCUMENTS

| | | | |
|---|---|---|---|
| 2,935,606 | 5/1960 | Harrison | 325/119 |
| 3,162,813 | 12/1964 | Piccinini | 325/119 |
| 3,946,390 | 3/1976 | Alexander | 325/352 |
| 4,081,631 | 3/1978 | Feder | 200/5 A |

Primary Examiner—Robert L. Griffin
Assistant Examiner—Tommy P. Chin
Attorney, Agent, or Firm—Margaret Marsh Parker; James W. Gillman

[57] ABSTRACT

A splash proof housing assembly for a portable two-way data terminal/radio having a waterproof front panel including keyboard and a waterproof seal joining the data terminal housing halves with a unique tongue and groove gasket and housing configuration.

5 Claims, 3 Drawing Figures

SPLASH PROOF PORTABLE TWO-WAY DATA TERMINAL/RADIO

BACKGROUND OF THE INVENTION

With the advent of portable radios for such uses such as public safety work, housings were developed which were more or less splash proof, since public safety officers are often exposed to adverse weather conditions in the course of their work.

When it became desirable to combine a data terminal with a portable two-way radio, it became obvious that many users of these would also be exposed to bad weather, and that combination units would also have to be at least splash proof. One-piece keyboards are known as in calculators, with a resilient cover and some type of tactile-response switches underneath designated areas of the cover. These, however, were not required to be splash proof since there was no expectation of outdoor use, and also the devices did not utilize a speaker/microphone.

Since, as in some of the intended applications of the present invention, the combined two-way data terminal/radio may be used in a train yard or ship yard, truck terminal or airport for freight management and routing, bad weather poses a serious problem to the dependability of the data terminal components. Also, any sound apertures must be well protected since they must prevent water access not only to the speaker and microphone but to the circuitry which, in such a compact device, must of necessity be closely adjacent. The interior components must, of course, be available for any necessary repairs.

SUMMARY OF THE INVENTION

It is therefore an object of the present invention to provide a splash proof housing for a combination data terminal/radio.

It is a particular object to provide such a housing which is sealed in such a fashion as to allow exposure to bad weather while preventing water damage to the interior components.

It is another particular object to provide such splash proof capability with relatively easy access for repair.

These objects and others are achieved in a housing in accordance with the present invention which includes front and back housing covers with mating portions and a unique gasket having a tongue and groove design. The mating portions of the housing covers are designed to combine with the gasket to provide a weatherproof seal, while allowing the housing covers to be separated for repair. The front panel including the sound apertures for the speaker/microphone is made of a combination of waterproof materials to provide waterproof protection for the circuitry of the data terminal.

DETAILED DESCRIPTION OF A PREFERRED EMBODIMENT

Figure 1:
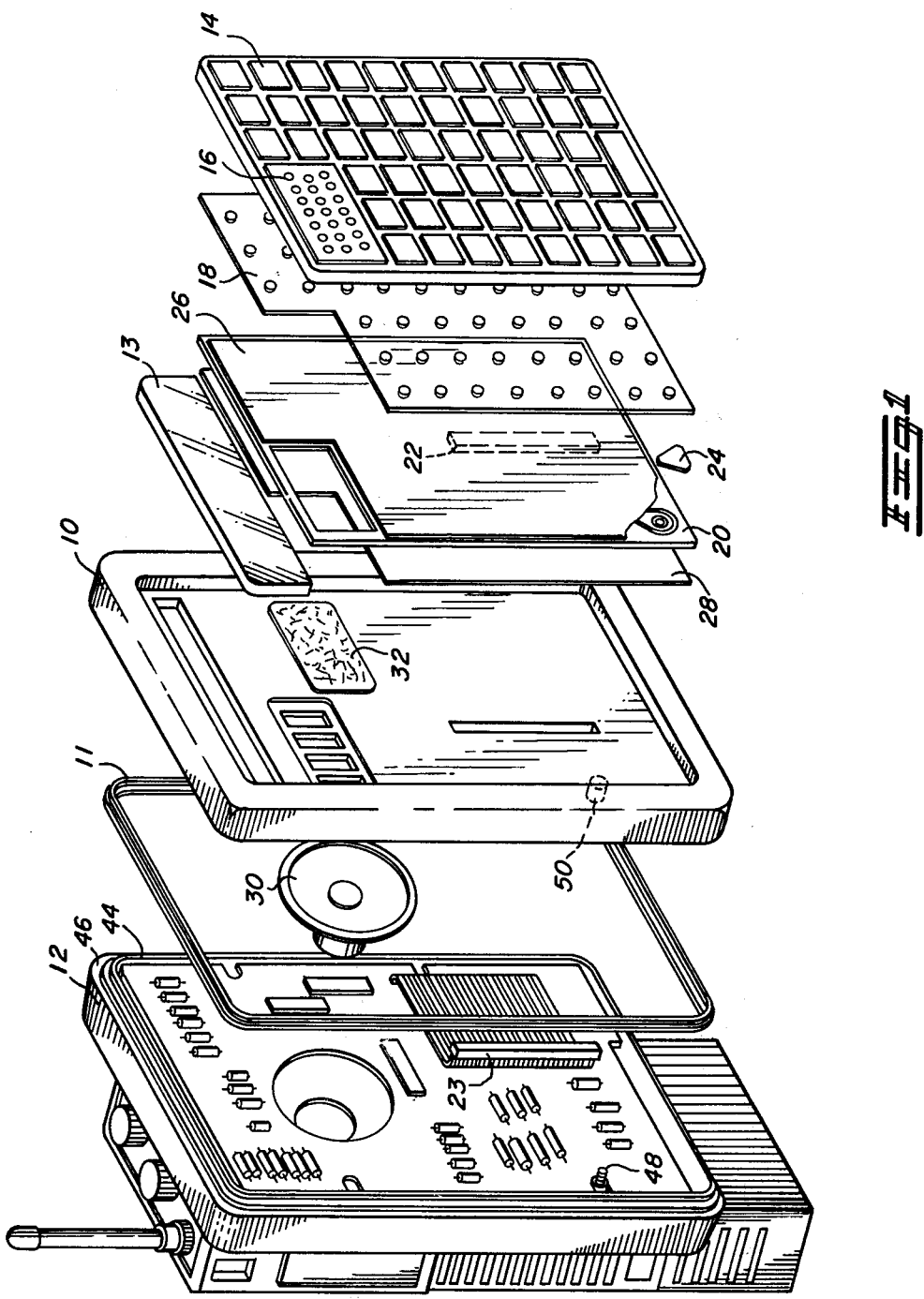
FIG. 1 is an exploded view of a typical application of the invention.

In the drawing like parts will be referenced throughout with like numerals.

In FIG. 1 is shown an exploded view of the most relevant parts of the assembled unit. The radio portion of the combined assembly is not shown since this does not bear on the present invention except indirectly. The basic structural parts of the assembly are a top cover 10, a gasket 11 and a back cover 12. From the front of the assembled unit the main visible parts would be the lens 13 and the touch pad 14 with sound grille openings 16. The touch pad would preferably be made of a resilient material such as silicone rubber. The touch pad 14 fits into a depressed area of the top cover 10 with a compression fit but is also sealed with a water proof sealant such as the one known commercially as RTV. Behind the touch pads, as is known, would be a popple board 18, this one being vacuum-formed of a material such as polycarbonate. A PC board 20 has circuitry on both sides, some of which is visible in FIG. 1, and a connector 22 is attached to the rear of the board 20 to mate with connector 23. The movable parts of the switches are comprised of "oil can" concave elements 24 which are adhesively attached to the rear of an insulating film 26 which is then attached to the front side of the PC board 20, providing both positioning and waterproofing for the circuitry on the front side of the board 20. The connector block 22 on back of the PC board 20 is mounted in such a fashion as to prevent any moisture from going from front to back of the board if such should be present. A second insulating film 28 seals the circuitry on the rear side of the PC board 20. On the rear side of the housing front cover, a speaker/microphone 30 is mounted. Over the speaker 30 and immediately behind the apertures in the silicone touch pad 14 is a layer 32 of a felt-like material which allows transmission of sound but prevents moisture from entering the interior of the unit. An example would be a material known as NB-25, manufactured by Nu-Way Speaker Products, Inc. The lens 13 covering a display read-out may be seen above the keyboard and speaker grille and this lens is, of course, cemented in and waterproof.

The gasket 11 is a much more resilient gasket than any known O-ring. In fact, in the preferred embodiment the gasket has a hardness of 25 on the Rockwell B scale as compared to the 50 hardness of a typical O-ring. This unusual softness or resiliency is a crucial factor in the quality of the seal, however the configuration of the gasket and the mating surfaces is even more crucial.

Figure 2:
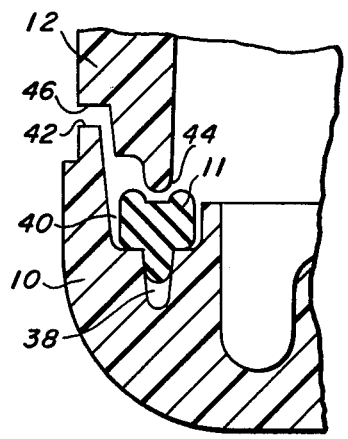
FIG. 2 is a cut-away view of the mating areas of the front and back housing covers before final assembly.

As may be seen in FIG. 2, the mating area of the housing front cover 10 includes a small groove 38 which receives the tongue of the gasket 11 with a relatively snug fit. Thus the gasket 11 is both aligned and retained by the groove 38 before assembly of the unit. A wider slot 40 of this mating surface is dimensioned to receive the body portion of the gasket 11 with room for lateral expansion of the gasket under compression. The mating area of the front cover 10 also includes a projection 42 which will be discussed further hereinbelow. The mating area of the housing rear cover 12 includes a tongue portion 44 and a shoulder portion 46.

Figure 3:
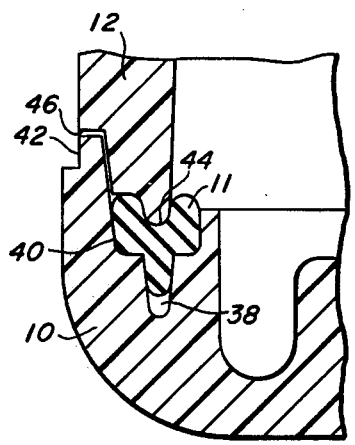
FIG. 3 is a figure similar to FIG. 2 showing the configuration of a completed assembly.

In FIG. 3 the same elements shown in FIG. 2 have now been fully assembled and the advantages of the configuration may be easily seen. The tongue 44 of the housing rear cover has mated with the groove of the gasket 11 and compressed it sufficiently to cause intimate contact between the sides of the gasket 11 and the inner walls of the slot 40. The projection 42 has now come into contact with the shoulder portion 46, thus limiting the amount of compression on the gasket 11 and preventing damage thereto. The projection 42, overlapping a portion of the rear cover 12, provides additional protection from rain or snow since the combined data terminal/radio would normally be held in the user's hand with the front or data terminal side up. Thus precipitation falling on the cover 10 would have to negotiate a tortuous path before even reaching the area of the gasket, thus adding an extra element of weather resistance.

While not specifically relevant to the present invention, it may be well to note at this point that the various inputs and outputs of the combined data terminal/radio unit are also water tight. Also, the two housing cover portions 10, 12 are held in compressive fit by screws which enter from the rear of the assembly and are retained thereby. A threaded end portion of each screw meets with a threaded recess 50 on the interior side of the housing front cover and the head of each screw is recessed on the rear side of the housing rear cover 12.

Thus there has been shown and described in accordance with the present invention a housing assembly for a combined data terminal/radio which has superior splash proof capability, such being important in the environments to which the unit is typically subjected. While the housing is readily opened for any necessary repairs, the two housing portions are sealed by the unique tongue-and-groove gasket and housing mating surface configuration. The one-piece keyboard has no visible apertures with the exception of those over the speakers/microphone and these apertures are made waterproof by a material allowing the transmission of sound but preventing the transmission of moisture. The actual switching assembly consists of a PC board with circuitry and associated contact members attached by waterproof and insulating films. It will be apparent that other variations and modifications of the assembly as described are possible and it is intended to cover all of those which fall within the spirit and scope of the appended claims.

What is claimed is:

1. A splashproof housing assembly for a portable two-way data terminal/radio combination comprising in combination:

a housing front cover having a first mating portion;

a housing back cover having a second mating portion, the entire area of the second mating portion being juxtaposed with the first mating portion when the housing is fully assembled;

highly resilient gasket means for being retained between said first and second mating portions, and having in cross section a body portion with a grooved portion and a tongue portion;

and wherein the first mating portion of the housing front ccver comprise a first groove for aligning and retaining the tongue portion of the gasket means, and a second groove for retaining the body portion of the gasket means, said second groove being slightly wider than the body portion of the gasket means, the second mating portion of the housing back cover comprising a tongue for mating with said grooved portion of the gasket means and the second mating portion also comprising a shoulder portion exterior to the tongue portion and the first mating portion comprising a projection exterior to said second groove and extending toward the housing back cover to abut said shoulder portion, allowing said tongue of said second mating portion to compress said gasket means to cause said gasket means to fill the width of the second groove of the housing front cover while preventing the application of damaging pressure on said gasket means.

2. A splashproof housing assembly in accordance with claim 1 wherein the housing front cover comprises a depressed front panel end wherein all apertures in the housing front cover are positioned in said depressed area and are covered by waterproof means.

3. A splashproof housing assembly in accordance with claim 2 wherein the waterproof means comprises a resilient data terminal touch pad having apertures only in one predetermined portion thereof, said touch pad being dimensioned to provide a compression fit within the walls of said depressed area, a waterproof sealant for attaching the edge surfaces of said touch pad to said walls of the depressed area, waterproof layer positioned rearward to said one predetermined portion of the touch pad, said layer allowing sound transmission.

4. A splashproof housing assembly in accordance with claim 3 wherein the assembly further includes additional circuitry and wherein the predetermined portion of the touch pad projects rearward of the remainder of the touch pad, the housing further including a printed circuit board, having a multiplicity of electrical contacts thereon and an aperture for snugly retaining the rearward projection of the touch pad, switching means for connecting predetermined ones of said contacts, and connector means retained on the rearward side of said printed circuit board for making contact between the circuits on said printed circuit board and the additional circuitry on the interior of the data terminal/radio.

5. A splashproof housing assembly in accordance with claim 4 and wherein the switching means comprises a multiplicity of depressible concave conductive means, a first waterproof film for retaining the conductive means in predetermined positions adjacent the printed circuit board contacts and for covering the frontward side of the connector means, a second waterproof film fixedly attached to the rearward side of said printed circuit board and covering the circuitry on said rearward side, and a semi-rigid actuator plate positioned between the resilient touch pad and the first waterproof film.

* * * * *